(12) United States Patent
Jouver, III (10) Patent No.: US 7,018,037 B1
(45) Date of Patent: Mar. 28, 2006

(54) OBJECT RETENTION SYSTEM FOR EYEGLASSES

(76) Inventor: Charles A. Jouver, III, 20 Shingle Mill Rd., Salem, CT (US) 06420

( * ) Notice: Subject to any disclaimer, the term of this patent is extended or adjusted under 35 U.S.C. 154(b) by 0 days.

(21) Appl. No.: 11/037,655

(22) Filed: Jan. 18, 2005

(51) Int. Cl.
G02C 5/14 (2006.01)

(52) U.S. Cl. .................. 351/121; 24/3.3; 24/10 R; 24/11 R (58) Field of Classification Search ............ 351/121, 351/111, 41, 158; 24/3.3, 3.7, 3.8, 10 R, 24/11 R, 11 F, 11 S
See application file for complete search history.

(56) References Cited

U.S. PATENT DOCUMENTS

| 1,636,740 | A | | 7/1927 | Hickey | |
|---|---|---|---|---|---|
| 1,833,792 | A | | 11/1931 | Pfaus et al. | |
| 2,614,305 | A | * | 10/1952 | Yeardley | 24/3.8 |
| 2,626,538 | A | | 1/1953 | Frum | 88/52 |
| 2,832,114 | A | * | 4/1958 | Mead | 24/10 R |
| 3,209,755 | A | | 10/1965 | McCarthy et al. | 128/348 |
| 3,266,111 | A | * | 8/1966 | Abel | 24/3.3 |
| D212,863 | S | | 12/1968 | Roberts | D56/4 |
| 3,647,059 | A | | 3/1972 | Humphreys | 206/58 |
| 3,741,635 | A | | 6/1973 | Wortman | 351/123 |
| 4,105,304 | A | | 8/1978 | Baker | 351/47 |
| 4,852,221 | A | * | 8/1989 | Antonucci | 24/10 R |
| 5,054,903 | A | | 10/1991 | Jannard et al. | 351/123 |
| 5,066,154 | A | * | 11/1991 | Renaud | 401/131 |
| D349,508 | S | | 8/1994 | Conway | D16/335 |
| 5,424,787 | A | | 6/1995 | Zegarelli | 351/111 |
| 5,829,103 | A | * | 11/1998 | Allen | 24/11 R |
| 5,867,874 | A | * | 2/1999 | Simpson | 24/336 |

* cited by examiner

Primary Examiner—Hung Xuan Dang
(74) Attorney, Agent, or Firm—Albert W. Hilburger (57) ABSTRACT

A system for retaining a slender elongated object adjacent an upper surface of an eyeglass temple member worn by an eyeglass wearer includes an elongated attachment member for mounting on the eyeglass temple member and an object gripper integral with and upstanding from the attachment member and substantially coextensive with the attachment member for releasably engaging the elongated object and capturing it adjacent the head of the eyeglass wearer. The attachment member is engageably received on the eyeglass temple member and the object gripper is a planar member having a concavely curved surface facing the head of the eyeglass wearer. The attachment member is integral with the object gripper and, in one instance, fully encircles the eyeglass temple member and, is of elastic material enabling slidable reception onto the eyeglass temple member yet providing its firm retention on the eyeglass temple member when a desired position thereon is achieved.

20 Claims, 6 Drawing Sheets

OBJECT RETENTION SYSTEM FOR EYEGLASSES

BACKGROUND OF THE INVENTION

1. Field of the Invention

The present invention relates generally to eyewear and, more particularly, to a system for retaining a slender elongated object adjacent an upper surface of an eyeglass temple member worn by an eyeglass wearer.

2. Description of the Prior Art

It is common practice for the wearer of eyeglasses to want to temporarily place a slender elongate object, typically a pencil, behind his or her ear to free a hand for another purpose. Without wearing eyeglasses, such a person would have no difficulty in so positioning the pencil. However, with eyeglasses of known construction in place, any attempt to so place the pencil would generally be unsuccessful or at least most difficult to achieve. This failure results from the fact that the eyeglass temple member already occupies the crevice between the base of the ear and the head which normally would hold the pencil in place absent the eyeglasses.

There have been attempts to overcome this difficulty. One such attempt can be found in U.S. Pat. No. 3,266,111 to Abel which discloses a U-shaped holding device constructed of open wire or molded or formed by stamping. The holding device is releasably attached to the temple piece of eyewear to support a pencil or other elongated item alongside the temple piece and relies on its resilient construction for holding the pencil in place. One problem with this design is that, with a pencil supported on the holding device, the upper part of the ear is urged outwardly away from the head of the user to an undesirable and unappealing extent. Also, with Abel, the relative positioning between the pencil and the holding device is necessarily fixed while it would be desirable for the user to be able to allow the pencil to assume a variety of positions while it is still being held firmly in place.

In a number of instances, eyewear has been modified for securing various objects to temple pieces. In U.S. Pat. No. D212,863 to Roberts, for example, the secured object is a miniature radio; in U.S. Pat. No. 3,209,755 to McCarthy et al., a nasal catheter holder; in U.S. Pat. No. 3,647,059 to Humphreys, a receptacle containing lens cleaning tissues; in U.S. Pat. No. 4,105,304 to Baker, side glare-eliminating shields; and in U.S. Pat. No. 5,424,787 to Zegarelli, a surgical mask support.

Another grouping of patents typifies a body of prior art in which friction devices are disposed on temple pieces for maintaining the eyeglasses on the wearer's head. These typical U.S. patents are noted as follows:

D349,508 to Conway;
U.S. Pat. No. 1,636,740 to Hickey;
U.S. Pat. No. 1,833,792 to Pfaus et al.;
U.S. Pat. No. 2,626,538 to Frum;
U.S. Pat. No. 3,741,635 to Wortman; and
U.S. Pat. No. 5,054,903 to Jannard et al.

It was in light of the foregoing that the present invention was conceived and has now been reduced to practice.

SUMMARY OF THE INVENTION

A system for retaining a slender elongated object adjacent an upper surface of an eyeglass temple member worn by an eyeglass wearer includes an elongated attachment member for mounting on the eyeglass temple member and an object gripper integral with and upstanding from the attachment member and substantially coextensive with the attachment member for releasably engaging the elongated object and capturing it adjacent the head of the eyeglass wearer. The attachment member is engageably received on the eyeglass temple member. The attachment member is integral with the object gripper and the object gripper is a planar member having a surface facing the head of the eyeglass wearer. The object gripper may be concave or textured to improve its ability to hold the elongated object in the position sought by the wearer.

In one instance, the attachment member fully encircles the eyeglass temple member and is of elastic material enabling slidable reception onto the eyeglass temple member yet providing its firm retention on the eyeglass temple member when a desired position thereon is achieved.

In another instance, a fastener system is provided for releasably attaching the attachment member to the eyeglass temple member in a transverse direction.

In still another instance, a bonding agent is applied to mating components for fixedly mounting the attachment member to the eyeglass temple member.

A primary feature, then, of the present invention is the provision of modified eyewear which includes a system for retaining a slender elongated object, for example, a pencil, adjacent an upper surface of an eyeglass temple member worn by an eyeglass wearer.

Another feature of the present invention is the provision of such modified eyewear which includes an elongated attachment member for mounting on the eyeglass temple member and an object gripper integral with and upstanding from the attachment member and substantially coextensive with the attachment member for releasably engaging the elongated object and capturing it with the head of the eyeglass wearer.

Still another feature of the present invention is the provision of such modified eyewear for which the attachment member is engageably received on the eyeglass temple member and the object gripper is a planar member having a substantially flat or concavely curved surface facing the head of the eyeglass wearer.

Yet another feature of the present invention is the provision of such modified eyewear for which the attachment member is integral with the object gripper and when received on the eyeglass temple member fully encircles the eyeglass temple member.

A further feature of the present invention is the provision of such modified eyewear for which the attachment member and the object gripper are composed of a suitable material, preferably elastic, enabling slidable reception onto the eyeglass temple member yet providing firm retention thereof on the eyeglass temple member when a desired position thereon is achieved.

Still a further feature of the present invention is the provision of such modified eyewear for which the attachment member is integral with the object gripper and when received on the eyeglass temple member only partially encircles the eyeglass temple member and for which the attachment member and the object gripper are composed of a suitable material, preferably elastic, enabling slidable reception onto the eyeglass temple member yet providing firm retention thereof on the eyeglass temple member when a desired position thereon is achieved. With this construction, the attachment member is attached to the eyeglass temple member by a transverse movement into engagement with the eyeglass temple member.

Yet a further feature of the present invention is the provision of such modified eyewear for which the attachment member is integral with the object gripper and including a fastener system for releasably attaching the attachment member to the eyeglass temple member.

Still another feature of the present invention is the provision of such modified eyewear for which the fastener system includes the attachment member having a pair of spaced mounting holes aligned with a mating pair of mounting holes in the eyeglass temple member and a screw receivable in each of the mounting holes and a nut threadedly engaged with each of the screws such that, when tightened, firmly attach the attachment member and the object gripper to the eyeglass temple member.

Yet a further feature of the present invention is the provision of such modified eyewear for which the fastener system includes a bonding agent for fixedly mounting the attachment member to the eyeglass temple member.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate several embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
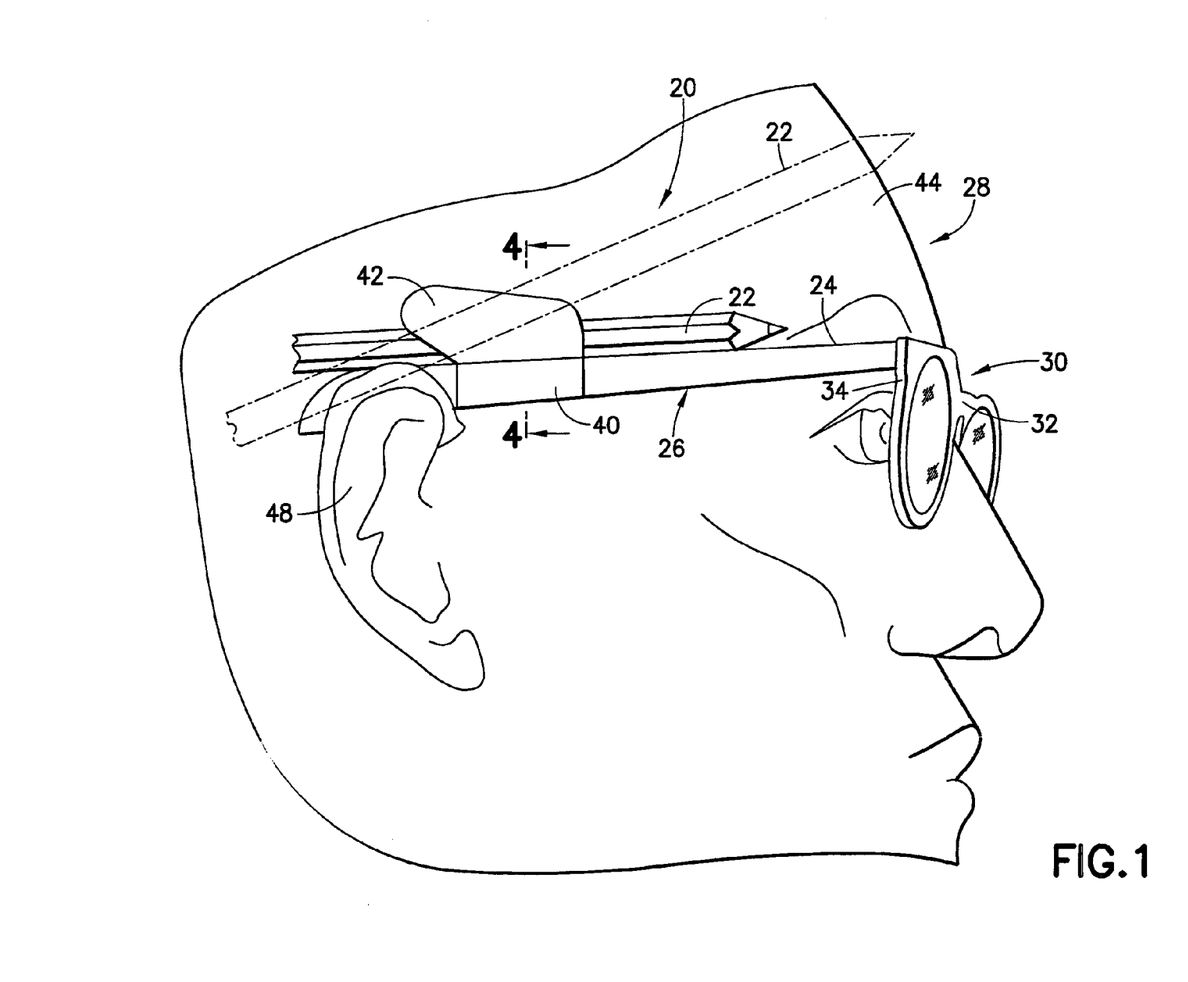
FIG. 1 is a perspective view illustrating a system embodying the present invention as applied to an eyeglass temple member worn by an eyeglass wearer.
Figure 2:
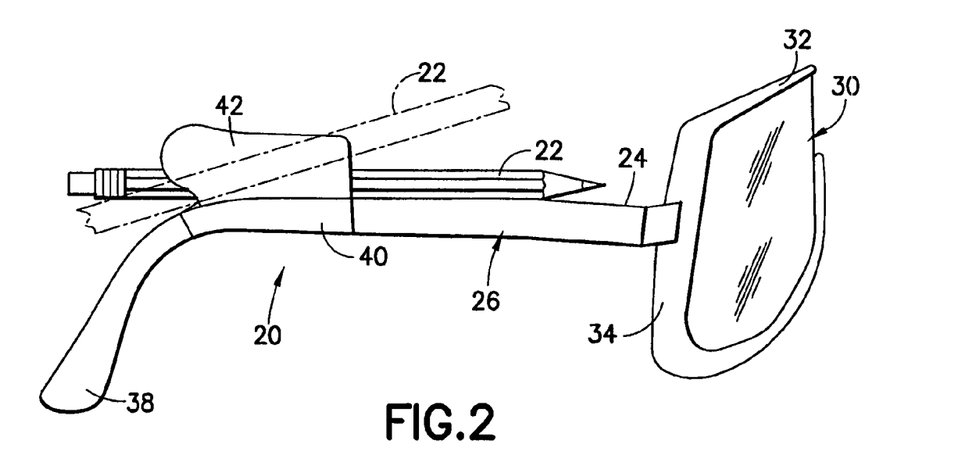
FIG. 2 is a side elevation view of the system illustrated in FIG. 1.
Figures 3, 4:
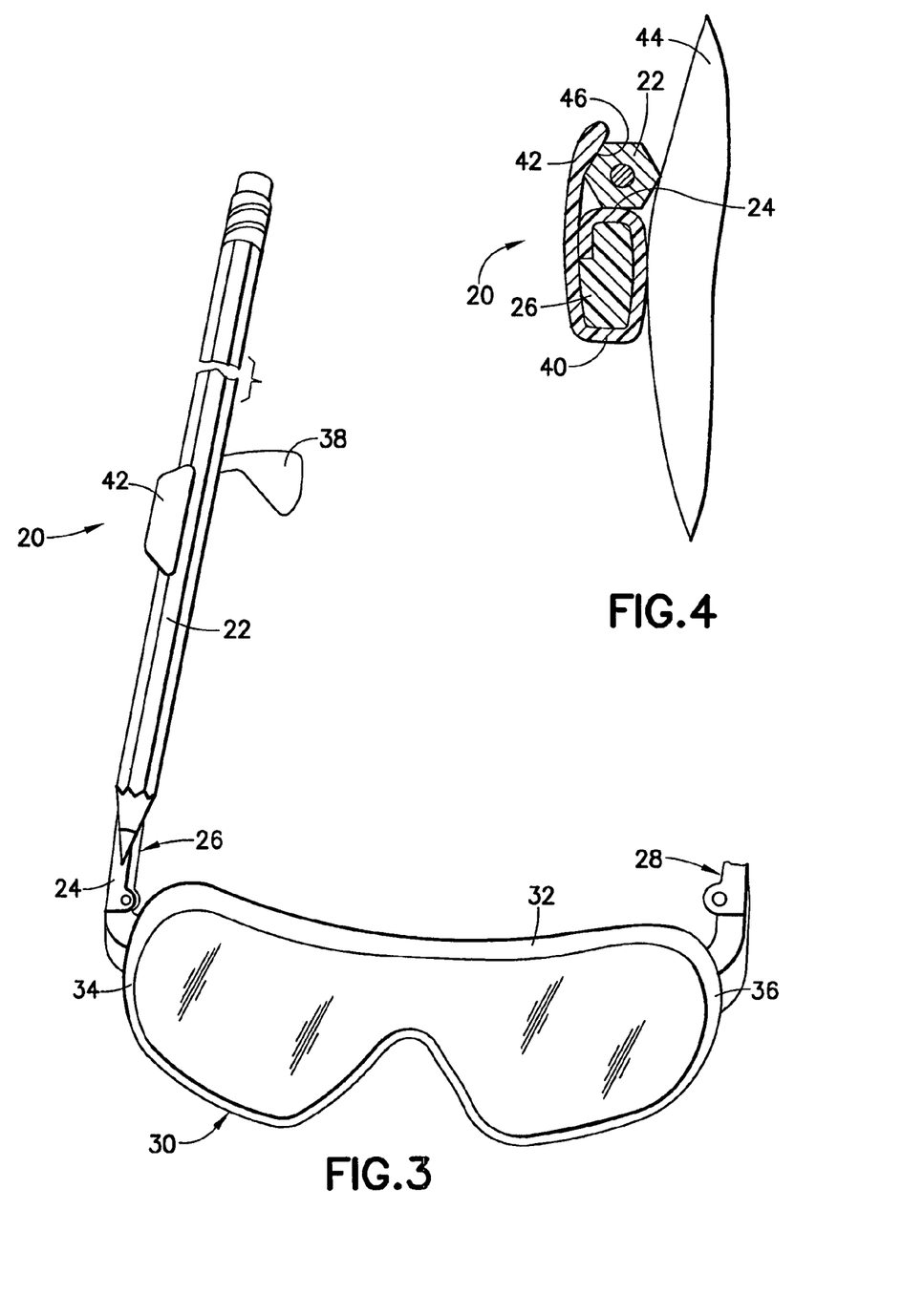
FIG. 3 is a frontal perspective view of the system illustrated in FIGS. 1 and 2.
FIG. 4 is a cross section view taken generally along line 4—4 in FIG. 1.
Figure 5:
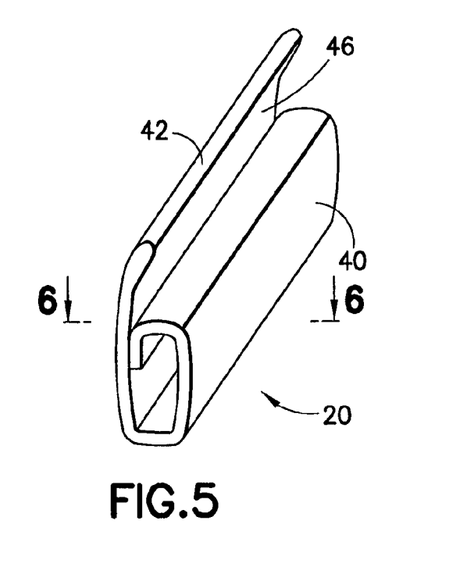
FIG. 5 is a detail perspective view of a component illustrated in FIGS. 1, 2, 3, and 4.
Figure 6:
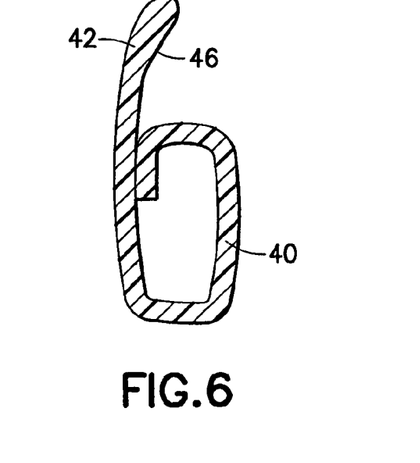
FIG. 6 is a cross section view taken generally along line 6—6 in FIG. 5.

Refer now to the drawings and, initially, to FIGS. 1, 2, and 3, which illustrate a system 20 for retaining a slender elongated object 22, such as a pencil, adjacent an upper surface 24 of an eyeglass temple member 26 worn by an eyeglass wearer 28. Although the present invention will be described with reference to the embodiments shown in the drawings, it should be understood that the present invention can be embodied in many alternate forms or embodiments. Any suitable size, shape or type of elements or materials may be used to practice the invention.

The system 20 is intended for a pair of eyeglasses 30, or eyewear, which includes a lens frame 32, the temple members 26 extending, respectively, from opposite sides 34, 36 (FIG. 3) of the lens frame, and ear pieces 38 extending, respectively, from the temple pieces.

The system 20 for retaining the slender elongated object 22 such as a pencil or the like, adjacent the upper surface 24 of the eyeglass temple member 26 includes an elongated attachment member 40 for mounting on the eyeglass temple member and an object gripper 42 which is integral with and upstanding from the attachment member and substantially coextensive with the attachment member. Viewing especially FIGS. 1 and 4, the object gripper serves to releasably engage the elongated object 22 and capture it with the head 44 of the eyeglass wearer. While the elongated object 22 is illustrated in FIGS. 1, 2, and 3 as lying on the upper surface 24 of the temple member 26, it will be appreciated that the elongated object may actually be positioned in a variety of orientations away from the upper surface 24 but remaining generally in the vertical plane of the temple member. Such an alternative position is shown by dashed lines in FIG. 2.

As seen in FIGS. 1–6, the attachment member 40 is engageably received on the eyeglass temple member 26, is integral with the object gripper 42 and, when received on the eyeglass temple member, as best seen in FIG. 4, fully encircles the eyeglass temple member. The object gripper 42 is a planar member having, alternatively, a generally flat surface 64 (FIGS. 9 and 10) or a concavely curved surface 46 (FIGS. 4 and 6) facing the head 44 of the eyeglass wearer. The attachment member and the object gripper are composed of a suitable material, preferably elastic, enabling slidable reception onto the eyeglass temple member yet providing the firm retention of the system 20 on the eyeglass temple member 26 when a desired position along its length is achieved.

It will be appreciated that, with this construction, the eyeglass wearer 30 can easily place the pencil 22 between his ear 48 and head 44 on the upper surface 24 of the temple member 26 so it is captured by the object gripper 42. By reason of the elasticity provided by the system 20, the pencil is held firmly between the concavely curved surface 46 and the eyeglass wearer's head 44. Also, since the pencil 22 is vertically aligned with the temple member 26, resting on its upper surface 24, or angularly disposed relative to the upper surface, it does not undesirably urge the upper part of the wearer's ear 48 away from his or her head 44. Rather, using the invention, the wearer's ear 48 remains in the same vertical plane or orientation which it occupies when the eyeglasses alone are worn.

Figure 7:
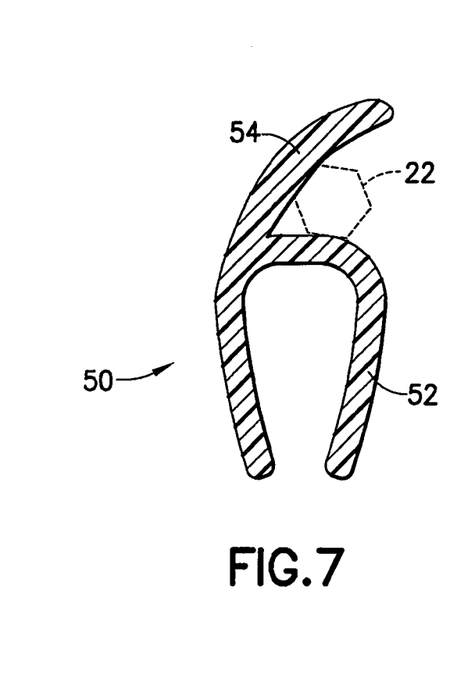
FIG. 7 is a cross section view, generally similar to FIG. 6, illustrating another embodiment of the invention.
Figure 8:
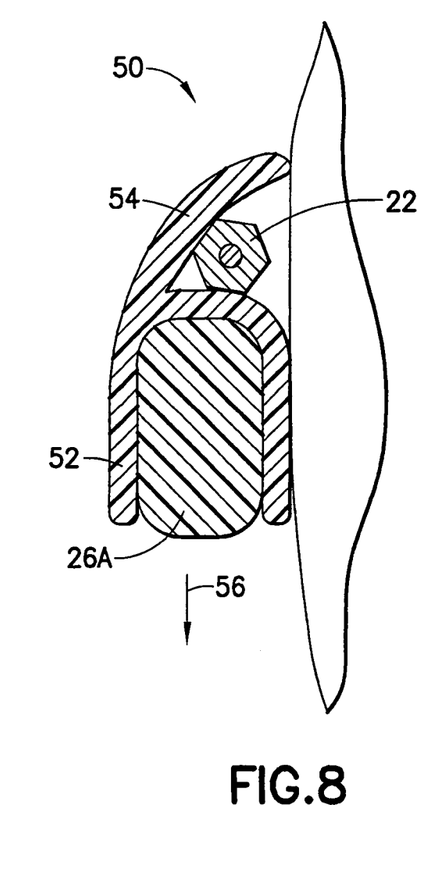
FIG. 8 is a cross section view, generally similar to FIG. 4, illustrating still another embodiment of the invention.

Another embodiment of the invention is illustrated in FIGS. 7 and 8 and referred to as system 50. In this instance, again, an attachment member 52 is integral with an object gripper 54 and, when received on an eyeglass temple member 26A, only partially encircles the eyeglass temple member. Also, as in the previous embodiment, the attachment member 52 and the object gripper 54 are composed of a suitable material, preferably elastic, enabling slidable reception onto the eyeglass temple member 26A in a transverse direction indicated by an arrow 56 while yet providing firm retention of the system 50 on the eyeglass temple member when a desired position thereon has been achieved. In all other respects, the system performs in the same manner as the system 20.

Figure 9:
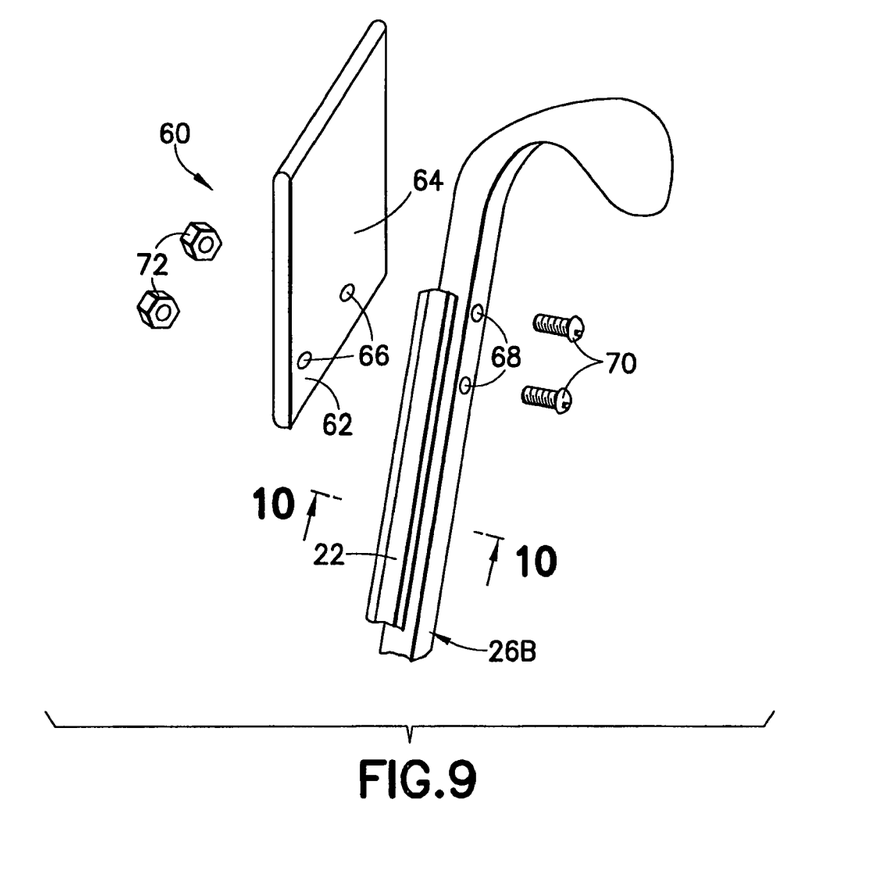
FIG. 9 is a detail exploded perspective view illustrating still another embodiment of the invention.
Figure 10:
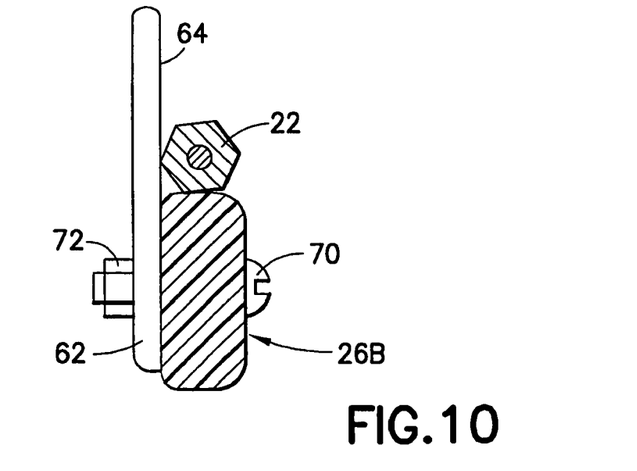
FIG. 10 is a cross section view taken generally along line 10—10 in FIG. 9 with the components in an unexploded condition.

Still another embodiment of the invention is illustrated in FIGS. 9 and 10 and referred to as system 60. In this instance also, an attachment member 62 is integral with an object gripper 64 and the system includes a fastener system for releasably attaching the attachment member to an eyeglass temple member 26B. For the fastener system 60, the attachment member 62 has a pair of spaced mounting holes 66 aligned with a mating pair of mounting holes 68 in the eyeglass temple member 26B. A screw 70 is receivable in each of the mounting holes 68 and a nut 72 is threadedly engaged with each of the screws 70 such that, when tightened (FIG. 10), the attachment member 64 and, with it, the object gripper 64, are firmly attached to the eyeglass temple member. In all other respects, the system 60 performs in the same manner as the systems 20 and 50.

Figure 11:
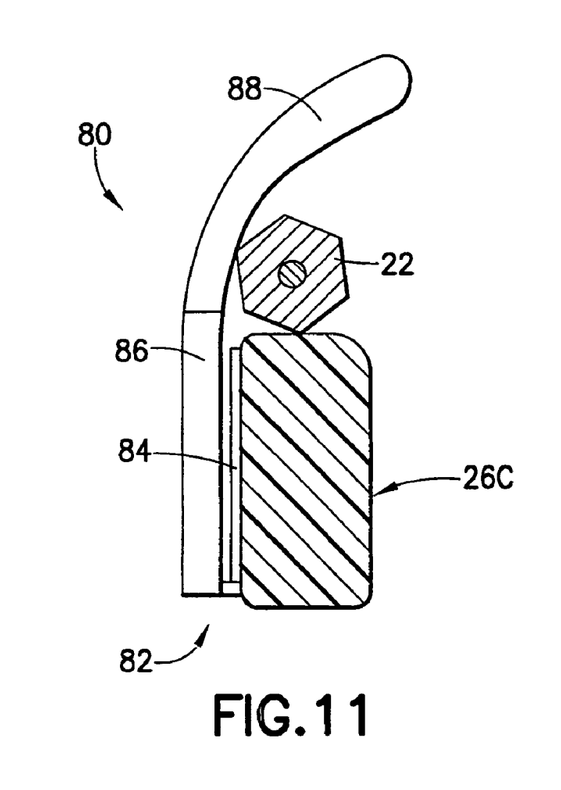
FIG. 11 is a cross section view, generally similar to FIG. 10, illustrating yet another embodiment of the invention.

Yet another embodiment of the invention is illustrated in FIG. 11 and referred to as system 80. In this instance, also, a fastener system 82 is provided and includes a suitable bonding agent 84 for fixedly mounting an attachment member 86 and integral object gripper 88 to an eyeglass temple member 26C. In all other respects, the system 80 performs in the same manner as the systems 20, 50, and 70.

Figure 12:
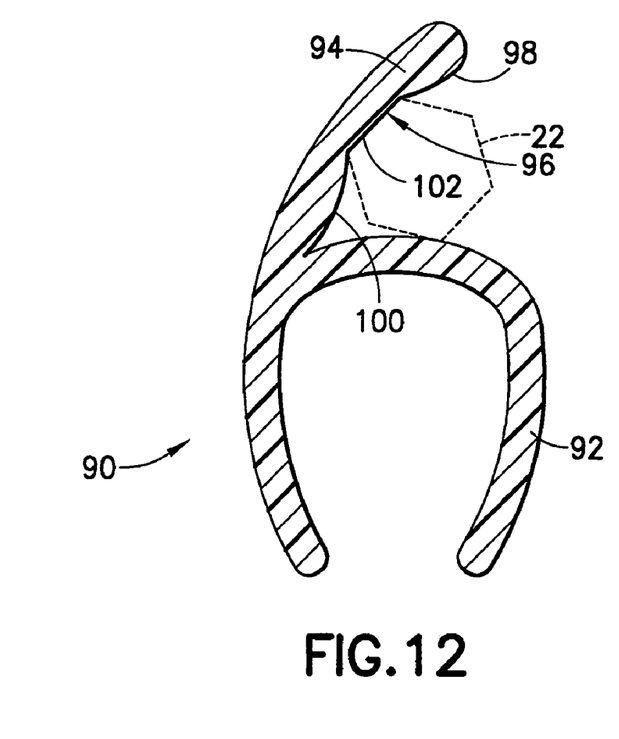
FIG. 12 is a cross section view, generally similar to FIG. 7, illustrating still a further embodiment of the invention.

Yet a further embodiment of the invention is illustrated in FIG. 12 and referred to as system 80. In this instance, also, an attachment member 92 is engageably received on the eyeglass temple member 26. While the attachment member 92 is shown to be generally of the configuration of the attachment member 52 illustrated in FIG. 7, this need not be the case but may be of any other suitable configuration. An object gripper 94 integral with and upstanding from the attachment member 92 is a planar member having a surface 96 facing the head of the eyeglass wearer. The surface 96 of the object gripper 94 is contoured with opposed raised portions 98, 100 and an intermediate valley portion 102 for engageably receiving the elongated object 22 and generally constraining the elongated object between the raised portions. With this construction, the elongated object 22 can more easily be held in an orientation indicated by dashed lines in FIGS. 1 and 2 while being firmly held in the crevice between the ear and head of the wearer.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for retaining a slender elongated object adjacent an upper surface of an eyeglass temple member worn by an eyeglass wearer comprising:
    an elongated attachment member for mounting on the eyeglass temple member; and
    an object gripper integral with and upstanding from the attachment member and substantially coextensive with the attachment member for releasably engaging the elongated object and capturing it with the head of the eyeglass wearer.

2. A retainer system as set forth in claim 1
   wherein the attachment member is engageably received on the eyeglass temple member; and
   wherein the object gripper is a planar member having a surface facing the head of the eyeglass wearer.

3. A retainer system as set forth in claim 2
   wherein the attachment member is integral with the object gripper and when received on the eyeglass temple member fully encircles the eyeglass temple member; and
   wherein the attachment member and the object gripper are composed of an elastic material enabling slidable reception onto the eyeglass temple member yet providing firm retention thereof on the eyeglass temple member when a desired position thereon is achieved.

4. A retainer system as set forth in claim 2
   wherein the attachment member is integral with the object gripper and when received on the eyeglass temple member only partially encircles the eyeglass temple member; and
   wherein the attachment member and the object gripper are composed of an elastic material enabling slidable reception onto the eyeglass temple member yet providing firm retention thereof on the eyeglass temple member when a desired position thereon is achieved.

5. A retainer system as set forth in claim 2
   wherein the attachment member is integral with the object gripper; and including:
      a fastener system for releasably attaching the attachment member to the eyeglass temple member.

6. A retainer system as set forth in claim 5
   wherein the fastener system includes:
   the attachment member having a pair of spaced mounting holes aligned with a mating pair of mounting holes in the eyeglass temple member;
   a screw receivable in each of the mounting holes; and
   a nut threadedly engaged with each of the screws such that, when tightened, firmly attach the attachment member and the object gripper to the eyeglass temple member.

7. A retainer system as set forth in claim 5
   wherein the fastener system includes:
   a bonding agent for fixedly mounting the attachment member to the eyeglass temple member.

8. A retainer system as set forth in claim 1
   wherein the attachment member is engageably received on the eyeglass temple member; and
   wherein the object gripper is a planar member having a surface facing the head of the eyeglass wearer, the surface being contoured with opposed raised portions and an intermediate valley portion for engageably receiving the elongated object.

9. A retainer system as set forth in claim 1
   wherein the attachment member is engageably received on the eyeglass temple member; and
   wherein the object gripper is a planar member having a concavely curved surface facing the head of the eyeglass wearer.

10. A retainer system as set forth in claim 1
    wherein the attachment member is engageably received on the eyeglass temple member; and
    wherein the object gripper is a planar member having a surface with an indented feature facing the head of the eyeglass wearer for engageably receiving the elongated object.

11. In a pair of eyeglasses which comprise a lens frame, temple members extending, respectively, from opposite sides of the lens frame, and ear pieces extending respectively from the temple pieces, the improvement of a system for retaining a slender elongated object adjacent an upper surface of an eyeglass temple member worn by an eyeglass wearer comprising:

an elongated attachment member for mounting on the eyeglass temple member; and an object gripper integral with and upstanding from the attachment member and substantially coextensive with the attachment member for releasably engaging the elongated object and capturing it with the head of the eyeglass wearer.

12. In a pair of eyeglasses as set forth in claim 11, the improvement:

wherein the attachment member is engageably received on the eyeglass temple member; and wherein the object gripper is a planar member having a surface facing the head of the eyeglass wearer.

13. In a pair of eyeglasses as set forth in claim 12, the improvement:

wherein the attachment member is integral with the object gripper and when received on the eyeglass temple member fully encircles the eyeglass temple member; and wherein the attachment member and the object gripper are composed of an elastic material enabling slidable reception onto the eyeglass temple member yet providing firm retention thereof on the eyeglass temple member when a desired position thereon is achieved.

14. In a pair of eyeglasses as set forth in claim 12, the improvement:

wherein the attachment member is integral with the object gripper; and including:

a fastener system for releasably attaching the attachment member to the eyeglass temple member.

15. In a pair of eyeglasses as set forth in claim 14, the improvement:

wherein the fastener system includes:

the attachment member having a pair of spaced mounting holes aligned with a mating pair of mounting holes in the eyeglass temple member;

a screw receivable in each of the mounting holes; and a nut threadedly engaged with each of the screws such that, when tightened, firmly attach the attachment member and the object gripper to the eyeglass temple member.

16. In a pair of eyeglasses as set forth in claim 14, the improvement:

wherein the fastener system includes:

a bonding agent for fixedly mounting the attachment member to the eyeglass temple member.

17. In a pair of eyeglasses as set forth in claim 14, the improvement:

wherein the attachment member is engageably received on the eyeglass temple member; and wherein the object gripper is a planar member having a surface with an indented feature facing the head of the eyeglass wearer for engageably receiving the elongated object.

18. In a pair of eyeglasses as set forth in claim 11, the improvement:

wherein the attachment member is engageably received on the eyeglass temple member; and wherein the object gripper is a planar member having a surface facing the head of the eyeglass wearer, the surface being contoured with opposed raised portions and an intermediate valley portion for engageably receiving the elongated object.

19. In a pair of eyeglasses as set forth in claim 11, the improvement:

wherein the attachment member is engageably received on the eyeglass temple member; and wherein the object gripper is a planar member having a concavely curved surface facing the head of the eyeglass wearer.

20. In a pair of eyeglasses as set forth in claim 11, the improvement:

wherein the attachment member is integral with the object gripper and when received on the eyeglass temple member only partially encircles the eyeglass temple member; and wherein the attachment member and the object gripper are composed of an elastic material enabling slidable reception onto the eyeglass temple member yet providing firm retention thereof on the eyeglass temple member when a desired position thereon is achieved.

* * * * *